US012561474B2

(12) United States Patent
Zhao et al.

(10) Patent No.: US 12,561,474 B2
(45) Date of Patent: Feb. 24, 2026

(54) INTERFACE INVOCATION REQUEST PROCESSING METHODS AND APPARATUSES

(71) Applicant: ALIPAY (HANGZHOU) INFORMATION TECHNOLOGY CO., LTD., Zhejiang (CN)

(72) Inventors: Hao Zhao, Hangzhou (CN); Juhu Nie, Hangzhou (CN); Shijie Cao, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 129 days.

(21) Appl. No.: 18/507,363

(22) Filed: Nov. 13, 2023

(65) Prior Publication Data

US 2024/0078338 A1 Mar. 7, 2024

Related U.S. Application Data

(63) Continuation of application No. PCT/CN2022/090212, filed on Apr. 29, 2022.

(30) Foreign Application Priority Data

May 13, 2021 (CN) .......................... 202110524051.4

(51) Int. Cl.
| | |
|---|---|
| *G06F 21/62* | (2013.01) |
| *G06F 9/46* | (2006.01) |

(Continued)

(52) U.S. Cl.
CPC .......... *G06F 21/6245* (2013.01); *G06F 9/468* (2013.01); *G06F 21/554* (2013.01);
(Continued)

(58) Field of Classification Search
None
See application file for complete search history.

(56) References Cited

U.S. PATENT DOCUMENTS

| | | | | |
|---|---|---|---|---|
| 8,656,465 | B1 * | 2/2014 | Fong-Jones | ......... G06F 21/6281 726/17 |
| 2015/0347770 | A1 * | 12/2015 | Whalley | ............. G06F 21/6245 726/30 |

(Continued)

FOREIGN PATENT DOCUMENTS

| | | | |
|---|---|---|---|
| CN | 102043931 | 5/2011 | |
| CN | 102043931 B | * 2/2013 | ............. G06F 17/30 |

(Continued)

OTHER PUBLICATIONS

Extended European Search Report in European Appln. No. 22806546.2, mailed on Jul. 16, 2024, 9 pages.

(Continued)

*Primary Examiner* — Philip J Chea
*Assistant Examiner* — Bin Qing Zheng
(74) *Attorney, Agent, or Firm* — Fish & Richardson P.C.

(57) ABSTRACT

Embodiments of this specification provide computer-implemented methods, apparatuses, and computer-readable storage media for interface invocation request processing. In an example interface invocation request processing method, an invocation request for a first interface of an operating system is received from a client application, and the first interface is configured to obtain privacy data. First scenario information is obtained, where the first scenario information is description information of a use scenario of the first interface declared when the client application applies for an invocation permission of the first interface. Current scenario information of the client application is obtained. The invocation request is executed in response to at least that the (Continued)

current scenario information matches the first scenario information.

11 Claims, 5 Drawing Sheets

(51) Int. Cl.
   *G06F 9/54*       (2006.01)
   *G06F 21/55*      (2013.01)
   *H04W 12/02*      (2009.01)
(52) U.S. Cl.
   CPC ........ *G06F 21/6281* (2013.01); *H04W 12/02* (2013.01); *G06F 9/54* (2013.01); *G06F 2221/2141* (2013.01)

(56)                References Cited

U.S. PATENT DOCUMENTS

| | | | |
|---|---|---|---|
| 2016/0098566 | A1   | 4/2016  | Patil et al. |
| 2017/0344731 | A1   | 11/2017 | Gefflaut et al. |
| 2019/0138698 | A1 * | 5/2019  | Qiu ........................ G06F 21/121 |
| 2021/0326465 | A1 * | 10/2021 | Tan ........................ G06F 21/604 |
| 2023/0297700 | A1 * | 9/2023  | Tang ........................ G06F 8/61 |
| | | | 726/17 |

FOREIGN PATENT DOCUMENTS

| | | | | | |
|---|---|---|---|---|---|
| CN | 109918930   |   | 6/2019  | | |
| CN | 109918930 A | * | 6/2019  | ............. | G06F 21/60 |
| CN | 110691129   |   | 1/2020  | | |
| CN | 110889148   |   | 3/2020  | | |
| CN | 111027051 A | * | 4/2020  | ............. | G06F 21/45 |
| CN | 111027094 A | * | 4/2020  | ......... | G06F 21/6245 |
| CN | 111523136 A | * | 8/2020  | .......... | G06F 21/604 |
| CN | 112689093   |   | 4/2021  | | |
| CN | 113407359   |   | 9/2021  | | |
| WO | WO 2022/237578 |  | 11/2022 | | |

OTHER PUBLICATIONS

Wijesekera et al., "Dynamically Regulating Mobile Application Permissions," IEEE Security & Privacy, Feb. 6, 2018, 16(1):64-71.
International Preliminary Report on Patentability in Appln. No. PCT/CN2022/090212, mailed on Nov. 23, 2023, 12 pages (with English translation).
International Search Report and Written Opinion in Appln. No. PCT/CN2022/090212, mailed on Jul. 8, 2022, 14 pages (with English translation).

* cited by examiner

INTERFACE INVOCATION REQUEST PROCESSING METHODS AND APPARATUSES

CROSS-REFERENCE TO RELATED APPLICATIONS

This application is a continuation of PCT Application No. PCT/CN2022/090212, filed Apr. 29, 2022, which claims priority to Chinese Patent Application No. 202110524051.4, filed on May 13, 2021. The disclosures of the aforementioned applications are hereby incorporated by reference in their entireties.

TECHNICAL FIELD

One or more embodiments of this specification relate to the technical field of computers, and in particular, to interface invocation request processing methods and apparatuses.

BACKGROUND

With rapid development of Internet technologies, especially mobile Internet technologies, a user can install various client applications on a mobile terminal of the user. These client applications can often obtain a large amount of privacy data from the mobile terminal. For these client applications, after any of the client applications is attacked, an attacker can steal privacy data of the user by using the attacked client application (hereinafter referred to as a malicious application). Therefore, there is an urgent need to provide a solution to effectively protect user privacy data.

SUMMARY

One or more embodiments of this specification describe interface invocation request processing methods and apparatuses that can effectively protect user privacy data.

According to a first aspect, an interface invocation request processing method is provided, including: receiving an invocation request for a first interface of an operating system from a client application, where the first interface is configured to obtain privacy data; obtaining first scenario information, where the first scenario information is description information of a use scenario of the first interface declared when the client application applies for an invocation permission of the first interface; obtaining current scenario information of the client application; and executing the invocation request when the current scenario information matches the first scenario information.

In one or more embodiments, the first scenario information includes a page list, and pages in the page list are selected from pages of the client application. The current scenario information includes a current display page and a previous display page of the client application. The executing the invocation request when the current scenario information matches the first scenario information includes the following: executing the invocation request if the current display page and the previous display page are included in the page list.

In other embodiments, the first scenario information includes an interface list, and interfaces in the interface list are selected from interfaces that invoke the first interface. The current scenario information includes a current invoking interface and a previous invoking interface of the first interface. The executing the invocation request when the current scenario information matches the first scenario information includes the following: executing the invocation request if the current invoking interface and the previous invoking interface are included in the interface list.

In still other embodiments, before the receiving an invocation request for a first interface of an operating system from a client application, the method further includes the following: receiving an invocation permission application for the first interface from the client application, where the invocation permission application includes at least the use scenario of the first interface declared by the client application; and configuring the first scenario information based on the use scenario of the first interface declared by the client application.

In still other embodiments, the invocation permission application further includes identity information of the client application. Before the configuring the first scenario information, the method further includes the following: determining, based on the identity information, whether the client application has the invocation permission of the first interface. The configuring the first scenario information based on the use scenario of the first interface declared by the client application includes the following: when the client application has the invocation permission, configuring the first scenario information based on the use scenario of the first interface declared by the client application.

According to a second aspect, an interface invocation request processing apparatus is provided, including the following: a receiving unit, configured to receive an invocation request for a first interface of an operating system from a client application, where the first interface is configured to obtain privacy data; an acquisition unit, configured to obtain first scenario information, where the first scenario information is description information of a use scenario of the first interface declared when the client application applies for an invocation permission of the first interface; where the acquisition unit is further configured to obtain current scenario information of the client application; and an execution unit, configured to execute the invocation request when the current scenario information matches the first scenario information.

In one or more embodiments, the first scenario information includes a page list, and pages in the page list are selected from pages of the client application. The current scenario information includes a current display page and a previous display page of the client application. The execution unit is specifically configured to execute the invocation request if the current display page and the previous display page are included in the page list.

In other embodiments, the first scenario information includes an interface list, and interfaces in the interface list are selected from interfaces that invoke the first interface. The current scenario information includes a current invoking interface and a previous invoking interface of the first interface. The execution unit is specifically configured to execute the invocation request if the current invoking interface and the previous invoking interface are included in the interface list.

In still other embodiments, the apparatus further includes a configuration unit. The receiving unit is further configured to receive an invocation permission application for the first interface from the client application, where the invocation permission application includes at least the use scenario of the first interface declared by the client application. The configuration unit is configured to configure the first scenario information based on the use scenario of the first interface declared by the client application.

In still other embodiments, the invocation permission application further includes identity information of the client application. The apparatus further includes a determining unit. The determining unit is configured to determine, based on the identity information, whether the client application has the invocation permission of the first interface. The configuration unit is specifically configured to configure the first scenario information based on the use scenario of the first interface declared by the client application when the client application has the invocation permission.

According to a third aspect, a computer storage medium is provided, the computer storage medium stores a computer program, and when the computer program is executed in a computer, the computer is enabled to perform the method according to the first aspect.

According to a fourth aspect, a computing device is provided, including a memory and a processor. The memory stores executable code, and when executing the executable code, the processor implements the method according to the first aspect.

One or more embodiments of this specification provide interface invocation request processing methods and apparatuses. An invocation request for a first interface of an operating system is received from a client application, where the first interface is used to obtain privacy data. First scenario information is obtained, where the first scenario information is description information of a use scenario of the first interface declared when the client application applies for an invocation permission of the first interface. Current scenario information of the client application is obtained. The invocation request is executed when the current scenario information matches the first scenario information. That is, in the solution provided in this specification, whether to execute the invocation request for the interface is determined by determining whether the current scenario information matches the description information of the declared use scenario of the interface, so that an invocation request outside the declared use scenario of the interface can be effectively intercepted, and effective protection of user privacy data can be implemented.

BRIEF DESCRIPTION OF DRAWINGS

To describe technical solutions in embodiments of this specification more clearly, the following briefly describes the accompanying drawings needed for describing the embodiments. Clearly, the accompanying drawings in the following description merely show some embodiments of this specification, and a person of ordinary skill in the art can still derive other drawings from these accompanying drawings without creative efforts.

DESCRIPTION OF EMBODIMENTS

The following describes the solutions provided in this specification with reference to the accompanying drawings.

Before the solutions provided in embodiments of this specification are described, the inventive concept of the solutions is described as follows.

As described above, when various different client applications are installed on a mobile terminal, an attacker may steal user privacy data by attacking the application. To resolve this problem, some solutions propose that in a process of installing a client application, the client application needs to declare a corresponding use scenario for each privacy interface (that is, configured to obtain privacy data) of an operating system to be invoked. Then, the client application invokes a corresponding privacy interface in the use scenario declared by the client application.

However, in actual application, a malicious application generally invokes a privacy interface beyond a use scenario of the corresponding privacy interface declared by the malicious application. Therefore, the inventors of this application propose that when the client application invokes the privacy interface of the operating system, current scenario information of the client application is obtained first, and then invocation of the privacy interface is executed only when the current scenario information matches description information of the declared use scenario of the privacy interface, thereby effectively ensuring security of the user privacy data.

The previous is the inventive concept provided in embodiments of the specification. The following describes the solutions provided in the specification with reference to the inventive concept.

Figure 1:
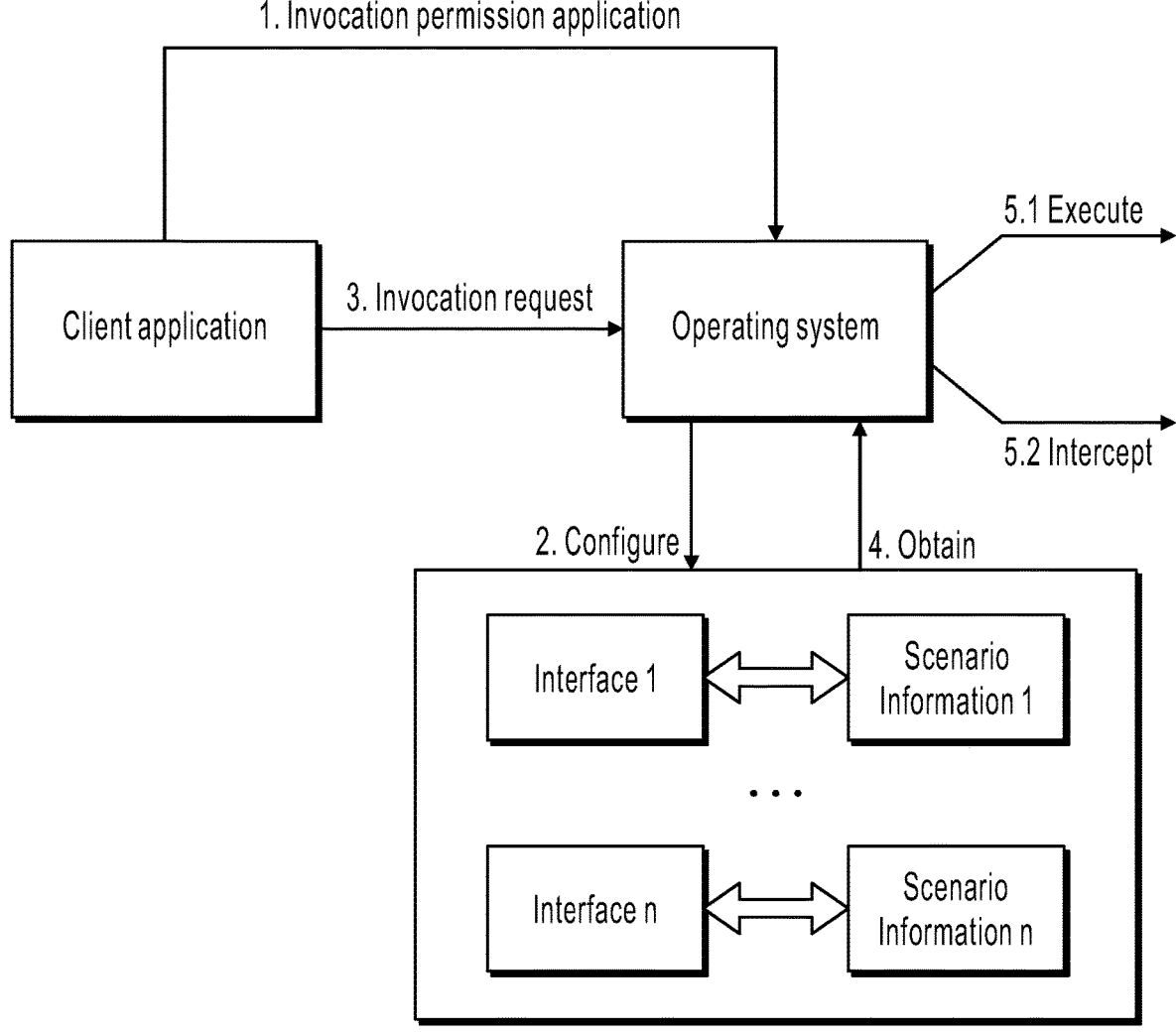
FIG. 1 is a schematic diagram illustrating an implementation scenario, according to one or more embodiments disclosed in this specification.

FIG. 1 is a schematic diagram illustrating an implementation scenario, according to one or more embodiments disclosed in this specification. In FIG. 1, the operating system can include interface 1 to interface n, and each interface can be used to obtain privacy data. During the installation of the client application, the client application can apply to the operating system for an invocation permission of each interface, and declare a use scenario for each interface. The operating system can configure corresponding scenario information for each interface based on the declared use scenario of each interface. The scenario information here can be, for example, a page list or an interface list.

Then, when the client application runs, the client application can send an invocation request for any interface i to the operating system. The operating system can obtain scenario information i corresponding to the interface i, and obtain current scenario information of the client application. If the obtained scenario information i matches the current scenario information, the invocation request is executed; otherwise, the invocation request is intercepted.

It should be understood that in actual application, multiple different client applications can apply to the operating system for invocation permissions for interface 1 to interface n, and the operating system can configure scenario information corresponding to each interface for each client application. In other words, one piece of scenario information can be uniquely matched based on one client application and one interface.

As described above, the interface invocation request processing method provided in embodiments of the specification is executed based on the scenario information configured in the installation phase of the client application. Therefore, the following first describes a scenario information configuration method. It is worthwhile to note that, for a client application, methods for configuring scenario information corresponding to all the interfaces are similar. Therefore, the following uses an example of configuring scenario information corresponding to one interface (hereinafter referred to as a first interface) for a client application for description.

Figure 2:
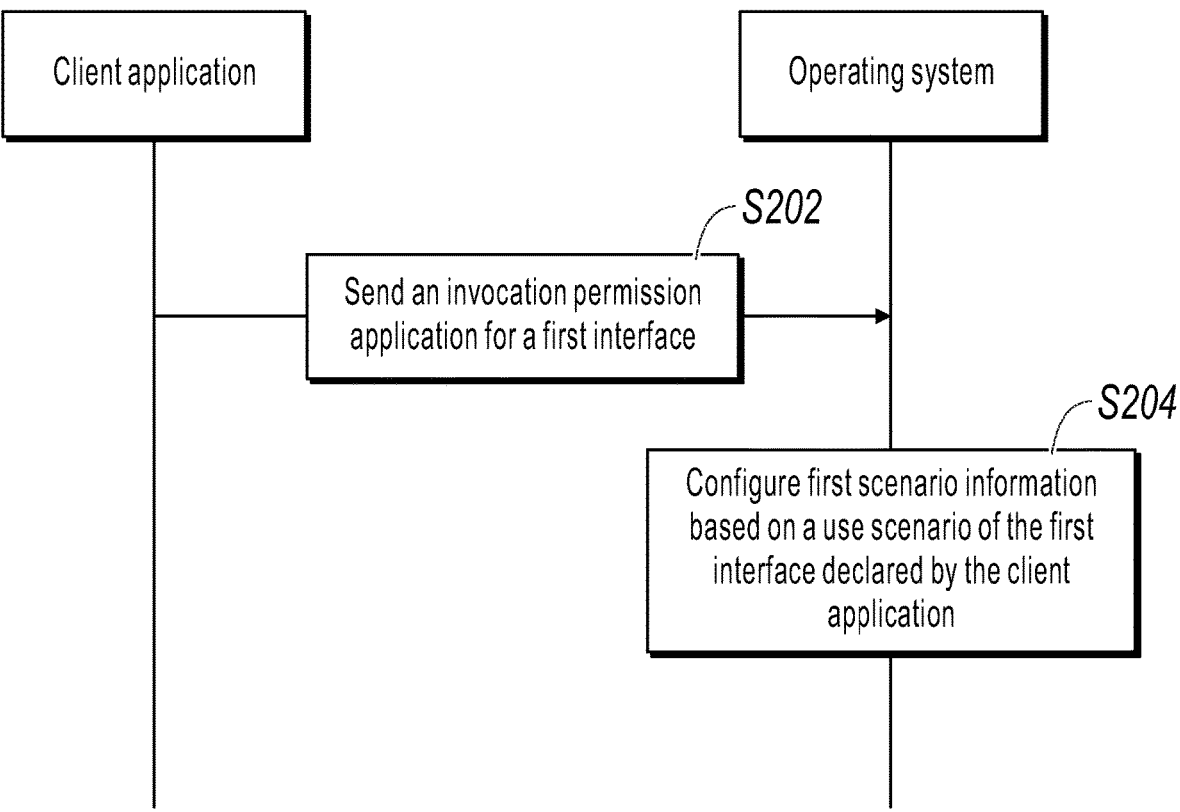
FIG. 2 is an interaction diagram illustrating a scenario information configuration method disclosed in one or more embodiments of this specification.

FIG. 2 is an interaction diagram illustrating a scenario information configuration method disclosed in one or more embodiments of this specification. As shown in FIG. 2, the method can include the following steps. Step 202: A client application sends an invocation permission application of a first interface to an operating system.

In an example, in a client application installation process, the client application can send the invocation permission application for the first interface to the operating system.

The above-mentioned client application can include any one of the following: an application on a mobile phone or a personal computer (personal computer, PC), a mobile phone applet, an application on The Internet of Things (The Internet of Things, IOT), etc. The above-mentioned first interface can be used to obtain privacy data, and is also referred to as a privacy interface. The privacy data here can include but is not limited to a biometric feature (such as a face feature, a fingerprint, or an acoustic wave), a location, an address book, etc. of the user.

The above-mentioned invocation permission application can include a use scenario of the first interface declared by the client application. The use scenario here can be, for example, a face recognition scenario, a two-dimensional code scanning scenario, etc.

In addition, the above-mentioned invocation permission application can further include identity information of the client application so that the operating system can determine, based on the identity information, whether the client application has an invocation permission of the first interface. That is, the operating system performs authentication on the client application.

Step 204: Configure first scenario information based on the use scenario of the first interface declared by the client application.

It should be understood that, when the above-mentioned invocation permission application further includes the identity information of the client application, the first scenario information can be configured when it is determined that the client application has the invocation permission of the first interface, or when authentication on the client application succeeds.

The first scenario information here can be, for example, a page list, or can be an interface list, etc.

When the first scenario information is the page list, the configuring first scenario information can include the following: selecting several pages from all pages of the client application based on the use scenario of the first interface declared by the client application; and forming the page list based on the several pages.

When the first scenario information is the interface list, the configuring first scenario information can include the following: selecting several interfaces from all interfaces that invoke the first interface based on the use scenario of the first interface declared by the client application; and forming the interface list based on the several interfaces.

So far, the first scenario information is obtained. Similarly, other scenario information can be further configured based on a use scenario of another interface declared by the client application. For another client application, multiple pieces of scenario information corresponding to interfaces can also be configured based on invocation scenarios of the interfaces declared by the another client application.

It should be understood that, after the scenario information corresponding to each interface is obtained through configuration for the client application, the solutions provided in embodiments of the specification can be executed.

Figure 3:
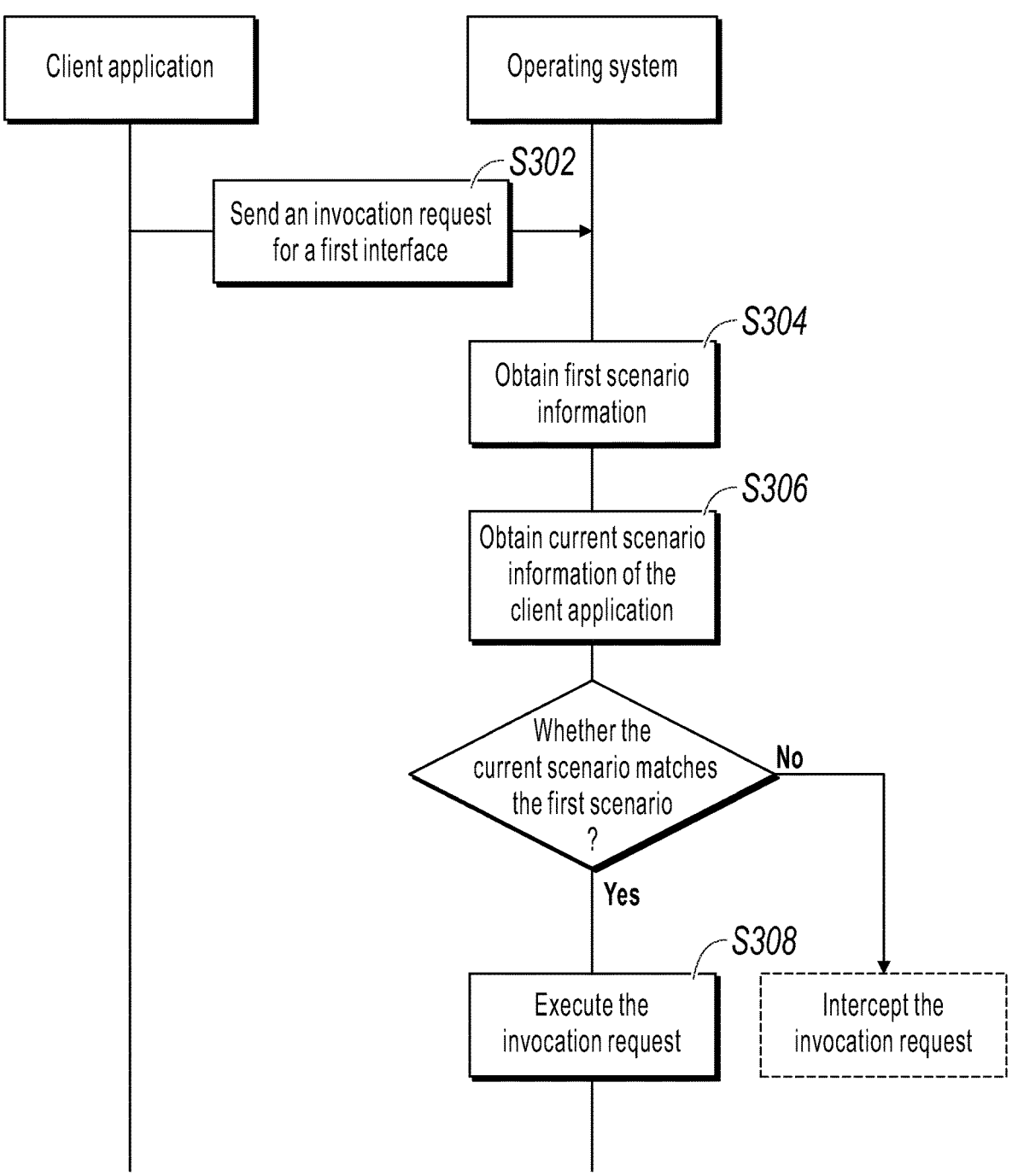
FIG. 3 is an interaction diagram illustrating an interface invocation request processing method disclosed in one or more embodiments of this specification.

FIG. 3 is an interaction diagram illustrating an interface invocation request processing method disclosed in one or more embodiments of this specification. As shown in FIG. 3, the method can include the following steps. Step 302: A client application sends an invocation request for a first interface of an operating system to the operating system.

The client application here can include any one of the following: an application on a mobile phone or a personal computer (personal computer, PC), a mobile phone applet, an application on the Internet of Things (The Internet of Things, IOT), etc.

The above-mentioned first interface can be used to obtain privacy data, and is also referred to as a privacy interface. The privacy data here can include but is not limited to a biometric feature, a location, an address book, etc. of a user.

Step 304: Obtain first scenario information.

The first scenario information is description information of a use scenario of the first interface declared when the client application applies for an invocation permission of the first interface.

As described above, in an installation stage of each client application, corresponding scenario information can be configured for each privacy interface for which the client application applies for an invocation permission. Therefore, the first scenario information can be obtained through matching from pre-configured scenario information based on the first interface and the client application that currently sends the invocation request.

The first scenario information here can be a page list, an interface list, etc.

Step 306: Obtain current scenario information of the client application.

If the above-mentioned first scenario information is a page list, the current scenario information here can include a current display page and a previous display page. The current display page here can be understood as the page displayed to the user when the client application initiates the invocation request for the first interface.

In an example, each display page of the client application can be recorded by setting a tracing point in the client application. Specifically, the tracing point can be set in the client application for a page display operation in advance. Then, when the page display operation is performed in the client application, the corresponding tracing point can be triggered to record the display page.

It should be understood that the current display page and the previous display page can be obtained based on each recorded display page of the client application.

The above-mentioned first scenario information being the interface list is still used as an example. The current scenario information here can include a current invoking interface and a previous invoking interface. The current invoking interface here can be understood as an interface that currently invokes the first interface.

Similar to the above-mentioned recording manner of the display page, each invoking interface of the first interface can be recorded in a manner of setting a tracing point. Then, the current invoking interface and the previous invoking interface are obtained based on all the recorded invoking interfaces.

Step 308: Execute the invocation request when the current scenario information matches the first scenario information.

Specifically, if the first scenario information is the page list, and the current scenario information includes the current display page and the previous display page of the client application, the executing the invocation request when the current scenario information matches the first scenario information includes the following: executing the invocation request when the current display page and the previous display page are included in the page list. Otherwise, if either the current display page or the previous display page is not included in the page list, the invocation request is intercepted.

If the first scenario information is the interface list, and the current scenario information includes the current invoking interface and the previous invoking interface of the first interface, the executing the invocation request when the current scenario information matches the first scenario information includes the following: executing the invocation request when the current invoking interface and the previous invoking interface are included in the interface list. Otherwise, if either the current invoking interface or the previous invoking interface is not included in the interface list, the invocation request is intercepted.

According to the previous description, in the interface invocation request processing method provided in the embodiments of the specification, whether to execute the interface invocation request is determined by determining whether the current scenario information matches the description information of the declared interface use scenario. As such an invocation request outside the declared interface use scenario can be effectively intercepted, and user privacy data can be effectively protected.

The following describes the solutions provided in embodiments of the specification by using the first scenario information as a page list.

Figure 4:
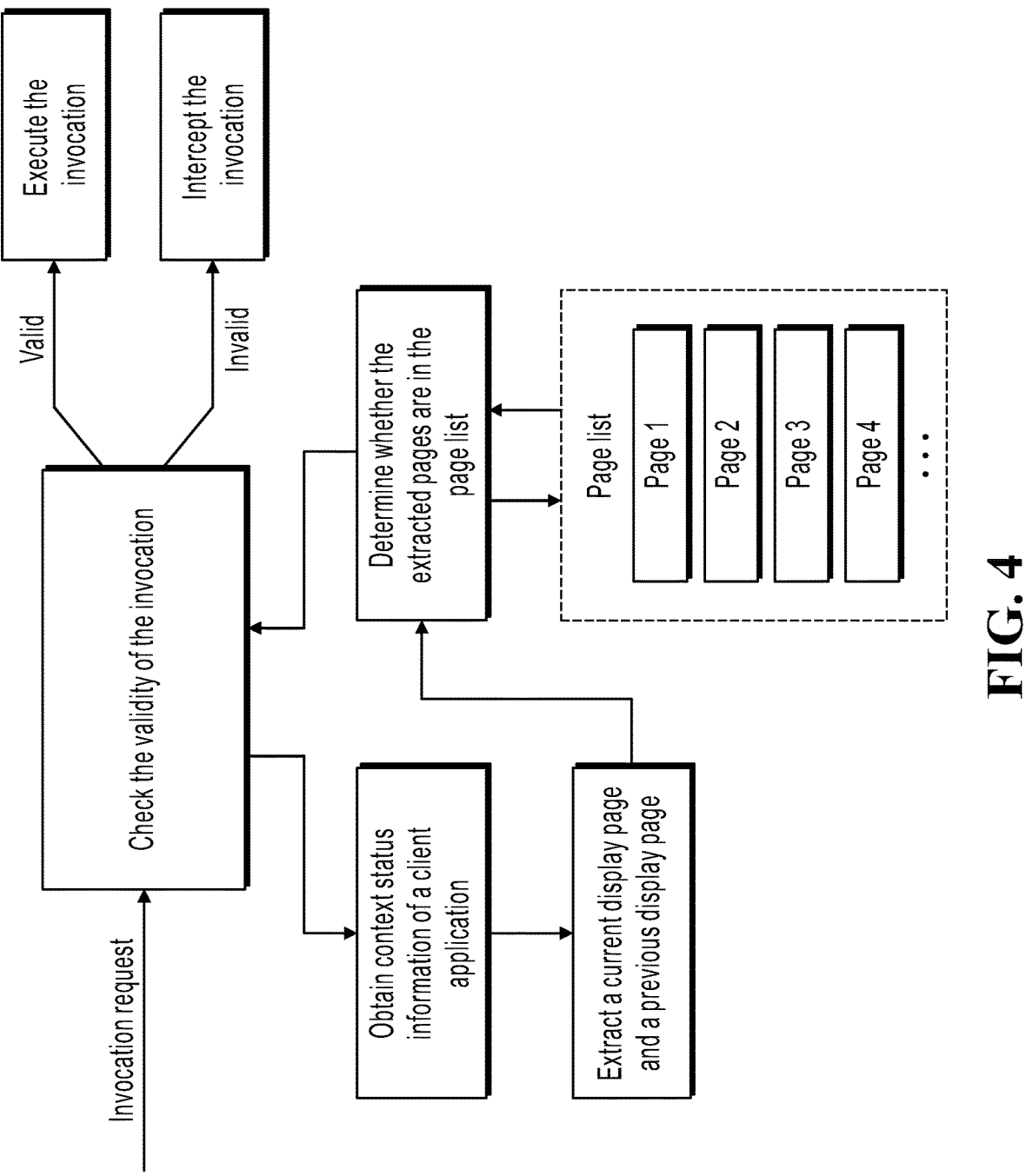
FIG. 4 is a schematic diagram illustrating an interface invocation request processing method disclosed in one or more embodiments of this specification.

FIG. 4 is a schematic diagram illustrating an interface invocation request processing method disclosed in one or more embodiments of this specification. In FIG. 4, an operating system receives an invocation request for a first interface from a client application, and then determines the validity of the invocation request. The validity determining here can specifically include the following: obtaining context status information of the client application, and extracting a current display page and a previous display page of the client application from the context status information; determining whether the current display page and the previous display page are included in a page list that matches the current client application and the first interface so as to obtain a determining result; and finally determining, based on the determining result, whether the invocation request is valid, and executing the invocation request if the invocation request is valid, or intercepting the invocation request if the invocation request is invalid.

Figure 5:
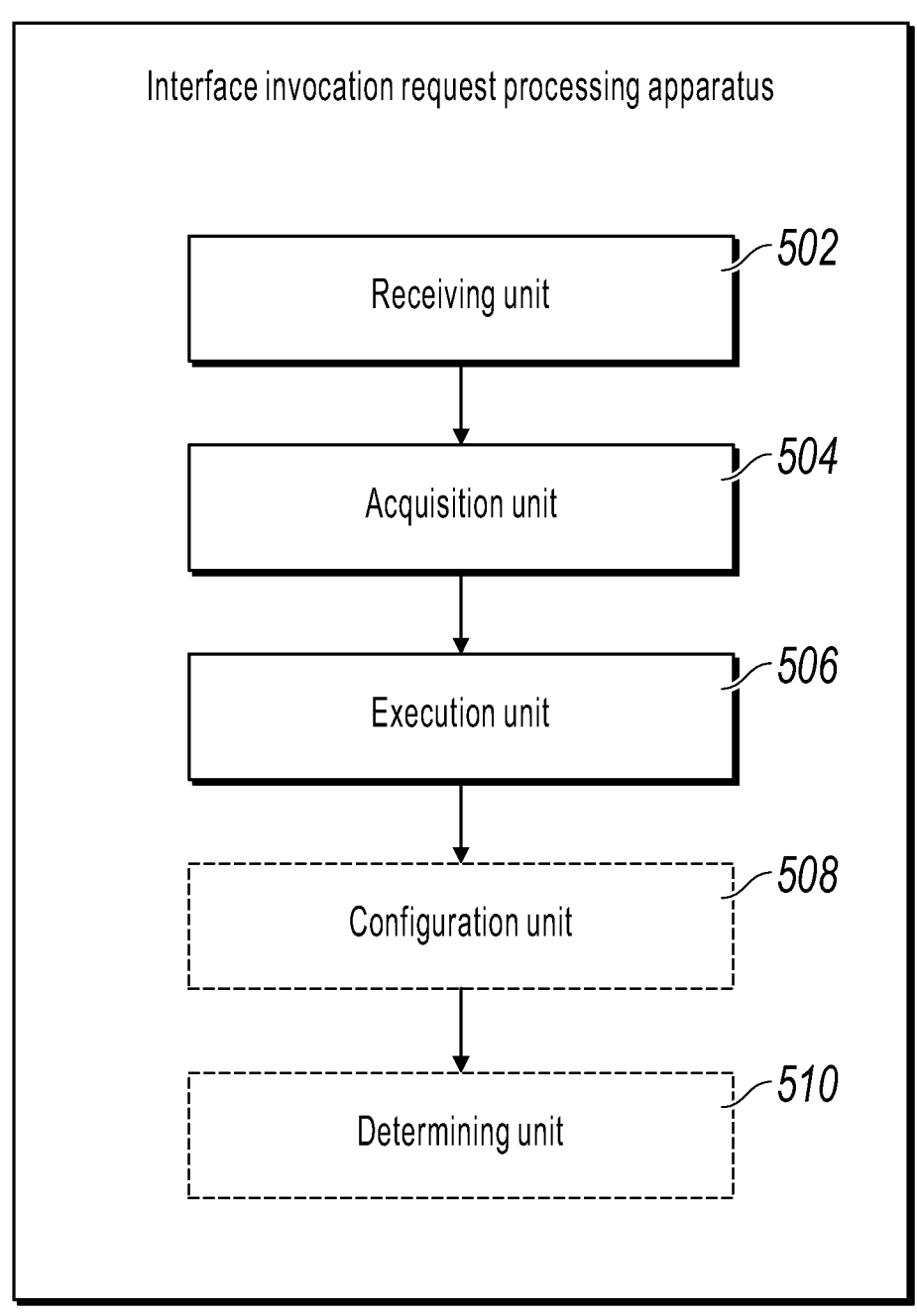
FIG. 5 is a schematic diagram illustrating an interface invocation request processing apparatus disclosed in one or more embodiments of this specification.

Corresponding to the above-mentioned interface invocation request processing method, embodiments of this specification further provide an interface invocation request processing apparatus. As shown in FIG. 5, the apparatus can include a receiving unit 502, an acquisition unit 504, and an execution unit 506. The receiving unit 502 is configured to receive an invocation request for a first interface of an operating system from a client application, and the first interface is used to obtain privacy data.

The acquisition unit 504 is configured to obtain first scenario information. The first scenario information is description information of a use scenario of the first interface declared when the client application applies for an invocation permission of the first interface.

The acquisition unit 504 is further configured to obtain current scenario information of the client application.

The execution unit 506 is configured to execute the invocation request when the current scenario information matches the first scenario information.

In an example, the first scenario information includes a page list, and pages in the page list are selected from pages of the client application. The current scenario information includes a current display page and a previous display page of the client application.

The execution unit 506 is specifically configured to execute the invocation request when the current display page and the previous display page are included in the page list.

In another example, the first scenario information includes an interface list, and interfaces in the interface list are selected from interfaces that invoke the first interface. The current scenario information includes a current invoking interface and a previous invoking interface of the first interface.

The execution unit 506 is specifically configured to execute the invocation request when the current invoking interface and the previous invoking interface are included in the interface list.

Optionally, the apparatus can further include a configuration unit 508. The receiving unit 502 is further configured to receive an invocation permission application for the first interface from the client application, where the invocation permission application includes at least a use scenario of the first interface declared by the client application. The configuration unit 508 is configured to configure first scenario information based on the use scenario of the first interface declared by the client application.

The above-mentioned invocation permission application further includes identity information of the client application, and the apparatus can further include a determining unit 510. The determining unit 510 is configured to determine, based on the identity information, whether the client application has an invocation permission of the first interface. The configuration unit 508 is specifically configured to configure the first scenario information based on the use scenario of the first interface declared by the client application when the client application has the invocation permission.

The functions of the functional modules of the apparatus in the previous embodiments of this specification can be implemented by performing the steps in the previous method embodiments. Therefore, a specific working process of the apparatus provided in the embodiments of this specification is omitted here for simplicity.

The interface invocation request processing apparatus provided in one or more embodiments of this specification can effectively protect user privacy data.

According to some embodiments of another aspect, a computer-readable storage medium is further provided, where a computer program is stored in the computer-readable storage medium, and when the computer program is executed in a computer, the computer is enabled to perform the method described with reference to FIG. 2, FIG. 3, or FIG. 4.

According to some embodiments of still another aspect, a computing device is further provided, including a memory and a processor. Executable code is stored in the memory, and when the processor executes the executable code, the method described with reference to FIG. 2, FIG. 3, or FIG. 4 is implemented.

The embodiments in this specification are described in a progressive way. For same or similar parts of the embodiments, references can be made to the embodiments mutually. Each embodiment focuses on a difference from other embodiments. Particularly, some device embodiments are briefly described since they are basically similar to some method embodiments. For related parts, references can be made to related descriptions in the method embodiments.

Method or algorithm steps described with reference to the content disclosed in this specification can be implemented by hardware, or can be implemented by the processor by executing a software instruction. The software instruction can include a corresponding software module. The software module can be stored in a RAM memory, a flash memory, a ROM memory, an EPROM memory, an EEPROM memory, a register, a hard disk, a removable hard disk, a CD-ROM, or any other form of storage medium well-known in the art. An example storage medium is coupled to the processor so that the processor can read information from the storage medium and can write information into the storage medium. Certainly, the storage medium can be a component of the processor. The processor and the storage medium can be disposed in an ASIC. In addition, the ASIC can be located in a server. Certainly, the processor and the storage medium can alternatively exist in the server as discrete components.

A person skilled in the art should be aware that in the above-mentioned one or more examples, functions described in this application can be implemented by hardware, software, firmware, or any combination thereof. When the functions are implemented by software, the above-mentioned functions can be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium can be any available medium accessible to a general-purpose or a dedicated computer.

Some specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and parallel processing are also possible or may be advantageous.

The objectives, technical solutions, and beneficial effects of this specification are further described in detail in the above-mentioned specific implementations. It should be understood that the above-mentioned descriptions are merely some specific implementations of this specification, but are not intended to limit the protection scope of this specification. Any modification, equivalent replacement, or improvement made based on the technical solutions in this specification shall fall within the protection scope of this specification.

What is claimed is:

1. A computer-implemented method, comprising:
   receiving an invocation request for a first interface of an operating system from a client application, wherein the first interface is configured to obtain privacy data;
   obtaining first scenario information, wherein the first scenario information comprises a first element of the client application and a second element of the client application, wherein the second element is configured to be activated subsequent to the first element of the client application based on a use scenario of the first interface declared by the client application when the client application applies for an invocation permission of the first interface;
   obtaining current scenario information of the client application; and
   executing the invocation request in response to at least that the current scenario information matches the first scenario information,
   wherein the first scenario information comprises a page list, the first element of the client application includes a first page of the client application, the second element of the client application includes a second page, and the current scenario information comprises a current display page and a previous display page of the client application; and
   the executing the invocation request in response to at least that the current scenario information matches the first scenario information comprises:
   executing the invocation request in response to at least that the current display page matches the second element of the client application and the previous display page matches the first element of the client application, and
   wherein the first scenario information comprises an interface list, the first element of the client application includes a second interface of the client application that invokes the first interface, the second element of the client application includes a third interface of the client application that invokes the first interface, and the current scenario information comprises a current invoking interface and a previous invoking interface of the first interface; and
   the executing the invocation request in response to at least that the current scenario information matches the first scenario information comprises:
   executing the invocation request in response to at least that the current invoking interface matches the second element of the client application and the previous invoking interface matches the first element of the client application.

2. The computer-implemented method of claim 1, before the receiving the invocation request for the first interface of the operating system from the client application, further comprising:
   receiving an invocation permission application for an invocation permission of the first interface from the client application, wherein the invocation permission application comprises at least the use scenario of the first interface declared by the client application; and
   configuring the first scenario information based on the use scenario of the first interface declared by the client application.

3. The computer-implemented method of claim 2, wherein the invocation permission application further comprises identity information of the client application, and before the configuring the first scenario information, the computer-implemented method further comprises:
   determining, based on the identity information, whether the client application has the invocation permission of the first interface; and
   the configuring the first scenario information based on the use scenario of the first interface declared by the client application comprises:

in response to at least that the client application has the invocation permission, configuring the first scenario information based on the use scenario of the first interface declared by the client application.

4. An apparatus for interface invocation request processing, the apparatus comprising:

one or more processors; and one or more computer-readable memories coupled to the one or more processors and having instructions stored thereon, wherein the instructions, when executed by the one or more processors, cause the one or more processors to perform operations comprising:

receiving an invocation request for a first interface of an operating system from a client application, wherein the first interface is configured to obtain privacy data;

obtaining first scenario information, wherein the first scenario information comprises a first element of the client application and a second element of the client application, wherein the second element is configured to be activated subsequent to the first element of the client application based on a use scenario of the first interface declared by the client application when the client application applies for an invocation permission of the first interface;

obtaining current scenario information of the client application; and executing the invocation request in response to at least that the current scenario information matches the first scenario information, wherein the first scenario information comprises a page list, the first element of the client application includes a first page of the client application, the second element of the client application includes a second page, and the current scenario information comprises a current display page and a previous display page of the client application; and the executing the invocation request in response to at least that the current scenario information matches the first scenario information comprises:

executing the invocation request in response to at least that the current display page matches the second element of the client application and the previous display page matches the first element of the client application, and wherein the first scenario information comprises an interface list, the first element of the client application includes a second interface of the client application that invokes the first interface, the second element of the client application includes a third interface of the client application that invokes the first interface, and the current scenario information comprises a current invoking interface and a previous invoking interface of the first interface; and the executing the invocation request in response to at least that the current scenario information matches the first scenario information comprises:

executing the invocation request in response to at least that the current invoking interface matches the second element of the client application and the previous invoking interface matches the first element of the client application.

5. The apparatus of claim 4, wherein, before the receiving the invocation request for the first interface of the operating system from the client application, the operations further comprise:

receiving an invocation permission application for the invocation permission of the first interface from the client application, wherein the invocation permission application comprises at least the use scenario of the first interface declared by the client application; and configuring the first scenario information based on the use scenario of the first interface declared by the client application.

6. The apparatus of claim 5, wherein the invocation permission application further comprises identity information of the client application, and before the configuring the first scenario information, the operations further comprise:

determining, based on the identity information, whether the client application has the invocation permission of the first interface; and the configuring the first scenario information based on the use scenario of the first interface declared by the client application comprises:

in response to at least that the client application has the invocation permission, configuring the first scenario information based on the use scenario of the first interface declared by the client application.

7. One or more non-transitory computer-readable storage media encoded with computer program instructions that when executed by one or more computers cause the one or more computers to perform operations comprising:

receiving an invocation request for a first interface of an operating system from a client application, wherein the first interface is configured to obtain privacy data;

obtaining first scenario information, wherein the first scenario information comprises a first element of the client application and a second element of the client application, wherein the second element is configured to be activated subsequent to the first element of the client application based on a use scenario of the first interface declared by the client application when the client application applies for an invocation permission of the first interface;

obtaining current scenario information of the client application; and executing the invocation request in response to at least that the current scenario information matches the first scenario information, wherein the first scenario information comprises a page list, the first element of the client application includes a first page of the client application, the second element of the client application includes a second page, and the current scenario information comprises a current display page and a previous display page of the client application; and the executing the invocation request in response to at least that the current scenario information matches the first scenario information comprises:

executing the invocation request in response to at least that the current display page matches the second element of the client application and the previous display page matches the first element of the client application, and wherein the first scenario information comprises an interface list, the first element of the client application includes a second interface of the client application that invokes the first interface, the second element of the client application includes a third interface of the client application that invokes the first interface, and the current scenario information comprises a current invoking interface and a previous invoking interface of the first interface; and the executing the invocation request in response to at least that the current scenario information matches the first scenario information comprises:

executing the invocation request in response to at least that the current invoking interface matches the second element of the client application and the previous invoking interface matches the first element of the client application.

8. The one or more non-transitory computer-readable storage media of claim 7, wherein, before the receiving the invocation request for the first interface of the operating system from the client application, the operations further comprise:

receiving an invocation permission application for the invocation permission of the first interface from the client application, wherein the invocation permission application comprises at least the use scenario of the first interface declared by the client application; and configuring the first scenario information based on the use scenario of the first interface declared by the client application.

9. The one or more non-transitory computer-readable storage media of claim 8, wherein the invocation permission application further comprises identity information of the client application, and before the configuring the first scenario information, the operations further comprise:

determining, based on the identity information, whether the client application has the invocation permission of the first interface; and the configuring the first scenario information based on the use scenario of the first interface declared by the client application comprises:

in response to at least that the client application has the invocation permission, configuring the first scenario information based on the use scenario of the first interface declared by the client application.

10. The computer-implemented method of claim 1, wherein activating the second element subsequent to the first element of the client application comprises:

displaying the second page of the client application subsequent to the first page of the client application.

11. The computer-implemented method of claim 1, wherein activating the second element subsequent to the first element of the client application comprises:

invoking the third interface of the client application subsequent to the second interface of the client application.

*    *    *    *    *